United States Patent [19]

Nakamura et al.

[11] Patent Number: 5,202,782
[45] Date of Patent: Apr. 13, 1993

[54] OPTICAL COMMUNICATION METHOD AND OPTICAL COMMUNICATION SYSTEM

[75] Inventors: Kenji Nakamura, Hatano; Jun Nitta, Sagamihara, both of Japan

[73] Assignee: Canon Kabushiki Kaisha, Tokyo, Japan

[21] Appl. No.: 640,938

[22] Filed: Jan. 14, 1991

[30] Foreign Application Priority Data

Jan. 19, 1990 [JP] Japan .................................. 2-008367
Jan. 19, 1990 [JP] Japan .................................. 2-010332

[51] Int. Cl.$^5$ ........................................... H04B 10/00
[52] U.S. Cl. ..................................... 359/152; 359/124
[58] Field of Search ............... 359/118, 120, 121, 154, 359/157, 164, 165, 173, 127, 133, 152, 124

[56] References Cited

U.S. PATENT DOCUMENTS 4,813,756  3/1989  Frenkel et al. .................. 359/127
4,873,681 10/1989  Arthurs et al. .................. 359/165
4,946,244  8/1990  Schembri ........................ 359/127

FOREIGN PATENT DOCUMENTS 60-0175025 9/1985 Japan .

OTHER PUBLICATIONS

Y. Kotaki, et al., "1.55 μm Wavelength Tunable FBH-DBR Laser," Electronics Letters, vol. 23, No. 7, Mar. 1987, pp. 325 through 327.
Patent Abstracts of Japan, Kokai No. 56-098948, vol. 5, No. 171, Oct. 1981.
Vuong, et al., "Some Practical Strategies for Reducing Intermodulation in Satellite Communications," IEEE Transactions on Aerospace and Electronic Systems, No. 6, Nov. 1988, pp. 755 through 764.
Glance, et al., "Densely Spaced FDM Coherent Optical System With Random Access Digitally Tuned Receiver," IEEE Global Telecommunications Conference and Exhibition, Nov. 1989, pp. 343 through 345.

Primary Examiner—Edward L. Coles, Sr.
Assistant Examiner—Kinfe-Michael Negash
Attorney, Agent, or Firm—Fitzpatrick, Cella, Harper & Scinto

[57] ABSTRACT

Disclosed is a method of and an apparatus for conducting communications using an optical communication system that includes a plurality of light transmitters and a plurality of light receivers mutually connected to the plurality of light transmitters. The communication method includes detecting, from a predetermined wavelength range, first and second wavelengths in one of the light transmitters, which wavelengths are different from each other and which have not been used by other light transmitters; conducting communications between one of the light transmitters and one of the light receivers using light having the first wavelength; and conducting communications between the light transmitter and the light receiver using light having the second wavelength when the quality of the communications using the light having the first wavelength deteriorates. Also disclosed is a method of and an apparatus for conducting communications using an optical communication system that includes a plurality of mutually connected light transceivers. This communication method includes conducting communications between those light transceivers which are a selected pair of light transceivers using light having a set wavelength; detecting interference in the communications between the selected pair of light transceivers and interference in those light transceivers other than the selected pair; and shifting the set wavelength to avoid the interference when interference is detected.

27 Claims, 10 Drawing Sheets

OPTICAL COMMUNICATION METHOD AND OPTICAL COMMUNICATION SYSTEM

BACKGROUND OF THE INVENTION

1. Field of the Invention

The present invention relates to a wavelength-division multiplexing optical communication method suitable for use in local area networks (LAN), or the like, and an optical communication system therefor.

2. Description of the Related Art

In conventional wavelength-division multiplexing optical communication methods, light signals having different wavelengths are transmitted over a single transmission line to enhance the efficiency of the transmission line. Conventional wavelength-division multiplexing optical communication systems generally include a plurality of terminals for transmitting light signals having different wavelengths, a light superimposition means for supplying the light signals to a single transmission line, a single transmission line, a separation means for separating required wavelength components from a wavelength-division multiplex signal, and a plurality of terminals for receiving the separated signals.

A semiconductor laser is generally used as a light source for emitting light from each terminal. An optical fiber is often used as the transmission line. The light superimposition means for supplying light signals having a plurality of wavelengths to the single optical fiber may be a light combining element, such as a half mirror or a beam splitter, or a light combining element which employs an optical wave-guide.

To separate a required wavelength component from the wavelength-division multiplex signal, a light wavelength filter or a prism is conventionally used.

Alternatively, the light heterodyne method is used to separate a required wavelength component. In the light heterodyne method, a light having a wavelength very close to that of a desired signal is mixed with the wavelength-division multiplex signal, and the resultant signal is converted into an electrical signal by means of a photo-detector. The obtained electrical signal is electrically filtered to obtain a difference frequency signal which is the required signal. The light heterodyne method has been attracting attention, because it is very effective to enhance the degree of wavelength-division multiplexing.

As stated above, optical communications generally employ, as a light source, a semiconductor laser which emits light whose wavelength is readily varied by the ambient temperature or other factors, and thus have the following drawbacks:

(1) In the method in which a required wavelength component is separated from the wavelength-division multiplex light signal using a light wavelength filter or a prism, the wavelength bandwidth for each light signal must be sufficiently broad in order to prevent interference of light signals having various wavelengths at the reception side during the separation which occurs when the wavelength of the light emitted from the semiconductor laser varies. This widens the range of the wavelengths employed in the communication, and thus, hinders an increase in the degree of multiplexing.

(2) In the method of separating the required wavelength component using the light heterodyne detection method, the wavelength of the light must be firmly fixed. To achieve this, the temperature of the light source portion is strictly controlled. In a case when very high wavelength stability is required, feedback control is performed by monitoring the wavelength of the light emitted by means of a spectrometer, or the like, and by using that wavelength to manipulate an input wavelength so as to bring the value of the controlled wavelength closer to a desired value.

However, any of these controls requires large-scaled circuits, thus increasing the production cost. Therefore, such systems are used only for particular optical communication systems, such as ones conducted over main lines.

SUMMARY OF THE INVENTION

In view of the aforementioned drawbacks of the prior art, an object of the present invention is to provide an optical communication method which can eliminate strict temperature control, and which assures reduction in the radio interference in order to enhance the degree of multiplexing, as well as to provide an optical communication system which employs the above optical communication method.

To achieve the above-described object, the present invention provides a method of conducting communications using an optical communication system that includes a plurality of light transmitters and a plurality of light receivers mutually connected to the plurality of light transmitters. The method comprises the steps of: searching, in a predetermined wavelength range, for first and second wavelengths in one of the light transmitters, which wavelengths are different from each other and which have not yet been used by other optical transmitters; conducting communications between a selected one of the light transmitters and a selected one of the light receivers using light having the first wavelength; and conducting communications between the selected light transmitter and the selected light receiver using light having the second wavelength when the quality of the communications using the light having the first wavelength deteriorates.

The present invention also provides a light transmitter for use with an optical communication system that includes a plurality of light transmitters and a plurality of light receivers mutually connected to the plurality of light transmitters. The transmitter includes detecting means, a first light source, a second light source, and a control means. The detecting means detects, from a predetermined wavelength range, first and second wavelengths which are different from each other and which have not been used by other light transmitters in the optical communication system. The first light source transmits a light signal using light having the first wavelength. The second light source transmits a light signal using light having the second wavelength. The control means selectively operates the first and second light sources in accordance with a command signal sent from one of the light receivers.

The present invention also provides a light receiver for use with an optical communication system that includes a plurality of light transmitters and a plurality of light receivers mutually connected to the plurality of light transmitters. The light receiver includes first light receiving means, second light receiving means and control means. The first light receiving means receives a light signal which has a first wavelength and which is sent from one of the light transmitters. The second light receiving means receives a light signal having a second wavelength different from the first wavelength. The control means controls communications using the light signal having the first wavelength and generates a signal which instructs the light transmitter to transmit the light signal using the light having the second wavelength, instead of the light having the first wavelength, when the quality of the communications deteriorates.

The present invention also provides an optical communication system, which includes a plurality of light transmitters, a plurality of light receivers, and connection means. Each of the plurality of light transmitters includes detecting means for detecting, from a predetermined wavelength range, first and second wavelengths which are different from each other and which have not been used in other light transmitters, a first light source for transmitting a light signal using light having the first wavelength, a second light source for transmitting a light signal using light having the second wavelength, and switching means for selectively operating the first and second light sources in accordance with a control signal. Each of the plurality of light receivers includes first light receiving means for receiving the light signal which has the first wavelength and which is sent from one of the light transmitters, second light receiving means for receiving the light signal having the second wavelength, and control means for controlling communications using the light signal having the first wavelength and for generating a signal which instructs the switching means to transmit signals using light having the second wavelength, instead of the light having the first wavelength, when the quality of the communications deteriorates. The connection means mutually connects the light transmitters to the light receivers.

The present invention also provides a method of conducting communications using an optical communication system that includes a plurality of mutually connected light transceivers. The method comprises the steps of: conducting communications between those light transceivers which are a selected pair of light transceivers using light having a set wavelength; detecting interference in the communications between the selected pair of light transceivers and interfeience in those light transceivers other than the selected pair; and shifting the set wavelength to avoid interference, when interference is detected in the detecting step.

The present invention also provides a light transceiver for use in an optical communication system that includes a plurality of mutually connected light transceivers. The light transceiver includes a variable wavelength light source, receiving means, detection means, and control means. The variable wavelength light source transmits a light signal having a set wavelength. The receiving means receives the light signal generated by the light source and receives a light signal sent from another light transceiver in the optical communication system. The detection means detects interference between the light signals received by the receiving means. The control means shifts the wavelength of the light signal generated by the light source when the detection means detects interference.

The present invention further provides an optical communication system that includes a plurality of light transceivers and connection means. Each of the plurality of light transceivers includes a variable wavelength light source for transmitting a light signal having a set wavelength, means for receiving the light signal generated by the light source and for receiving a light signal sent from another light transceivers, detection means for detecting interference between the signals, and control means for shifting the wavelength of the light signal generated by the light source when the detection means detects interference. The connection means mutually connects the plurality of light transceivers.

The present invention further provides a light transceiver for use in an optical communication system that includes a plurality of mutually connected light transceivers. The light transceiver includes a variable wavelength light source, first, second, and third variable wavelength filters, an optical device, first, second, and third photodetectors, an approach detection circuit, and a control circuit. The variable wavelength light source transmits a light signal at a set wavelength. The first variable wavelength filter passes light having a narrow wavelength range, the center of which range coincides with the set wavelength. The second variable wavelength filter passes light having a narrow wavelength range, the center of which range is slightly shorter than the set wavelength. The third variable wavelength filter passes light having a narrow wavelength range, the center of which range is slightly longer than the set wavelength. The optical device inputs both the light signal generated by the light source and the light signal sent from another light transceiver into the first, second, and third variable wavelength filters, respectively. The first, second, and third photo-detectors respectively receive the light which is passed through the first, second, and third variable wavelength filters and generate respective outputs. The approach detection circuit detects, from the outputs of the second and third photodetectors, an approach between the wavelength of the light signal generated by the light source and a wavelength of the light signal transmitted from the other light transceiver. The control circuit shifts the set wavelength of the light source when the approach detection circuit detects an approach between the wavelengths of the light signals.

The present invention further provides a light transceiver for use in an optical communication system that includes a plurality of mutually connected light transceivers, which light transceiver includes a variable wavelength light source, first and second light modulators, an optical device, a photodetector, a mixture circuit, a filter, and a control circuit. The variable wavelength light source emits a light signal having a set wavelength. The first light modulator modulates a portion of the light emitted from the light source using a signal to be transmitted. The second light modulator modulates another portion of the light emitted from the light source in accordance with a signal having a predetermined first frequency. The optical device mixes a portion of the light signal modulated by the first light modulator, a light signal transmitted from another light transceiver and a light signal modulated by the second light modulator, and produces a mixed light signal. The photo detector detects the light signal mixed by the optical device and produces an output. The mixture circuit mixes the output of the photo-detector with an electrical signal having a predetermined second frequency. The filter passes a signal component having a low frequency and separated from the range of the second frequency of the electrical signal mixed in the mixture circuit. The control circuit detects, from the signal component which is passed through the filter, an approach between the wavelength of the light emitted from the light source and a wavelength of the light signal transmitted from another light transceiver, and shifts the set wavelength of the light source when an approach between the wavelengths of the light signals has been detected.

DETAILED DESCRIPTION OF THE PREFERRED EMBODIMENTS

Figure 1:
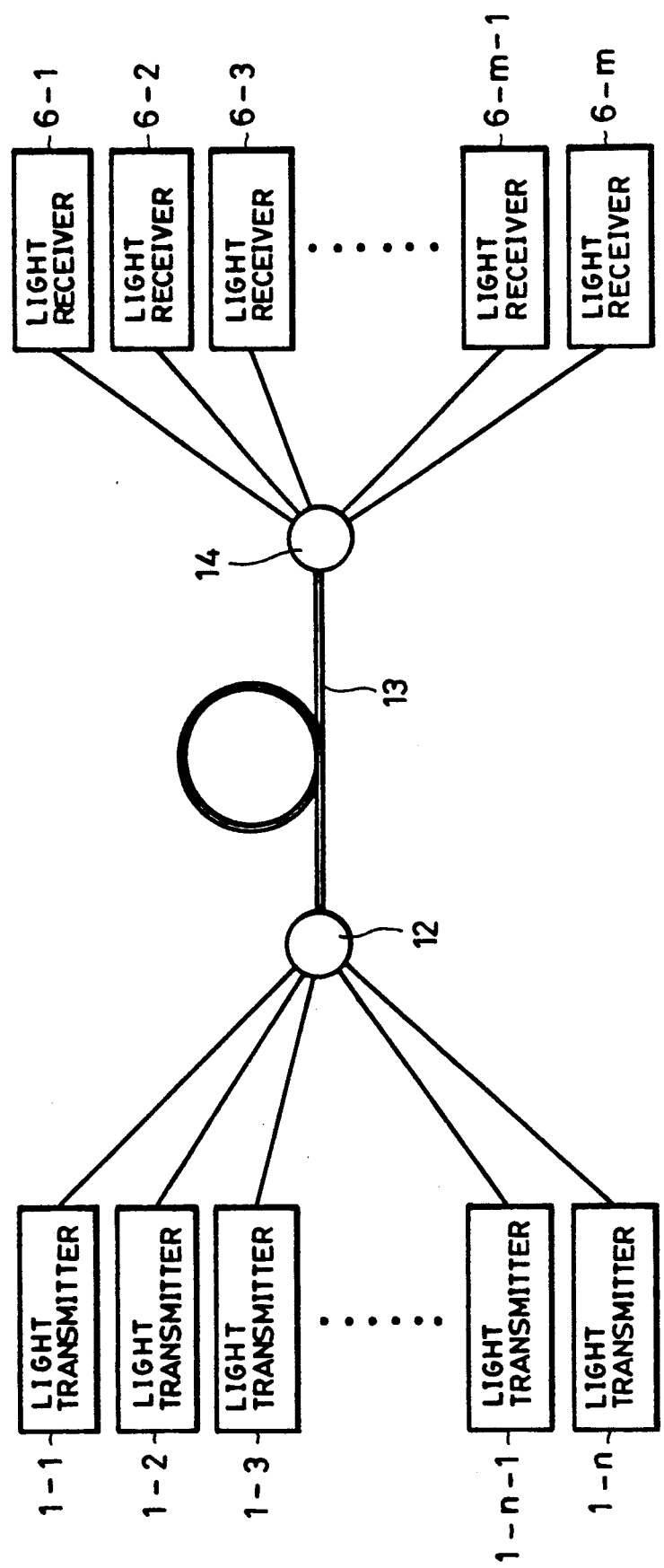
FIG. 1 is a block diagram of a first embodiment of an optical communication system according to the present invention.

FIG. 1 is a block diagram of a first embodiment of an optical communication system according to the present invention. In FIG. 1, reference numerals 1—1, 1-2, . . ., 1-n denote light transmitters, reference numeral 12 denotes an optical star coupler, 13 denotes an optical fiber, 14 denotes a light branching/combining device, and reference numerals 6-1, 6-2, . . . 6-m denote light receivers.

Communications are performed between the light transmitter 1-i (i = 1 to n) and the light receiver 6-j (j = 1 to m) through the optical star coupler 12, the optical fiber 13, and the light branching/combining device 14.

Figure 2:
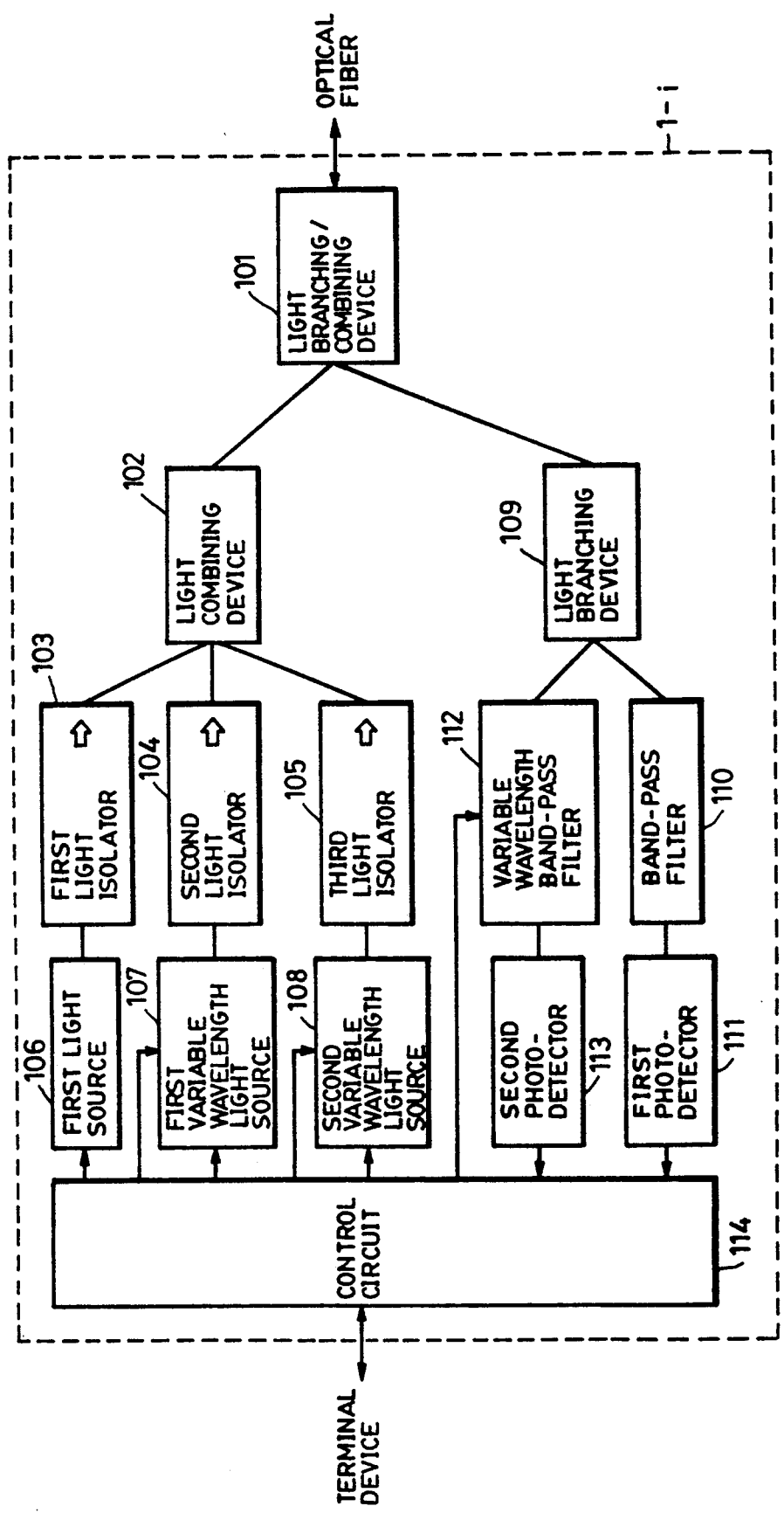
FIG. 2 is a block diagram of an optical transmitter employed in the first embodiment.

FIG. 2 shows the configuration of the light transmitter 1-i of FIG. 1. The light transmitter 1-i includes a light branching/combining device 101 for dividing the light signal from an optical fiber transmission system and for supplying the signal from a terminal to the transmission system, a light combining device 102, first, second and third light isolators 103, and 105 which form arithmetical circuits, a first light source 106 which may be a semiconductor laser, the first light source emitting oscillating light having a setting wavelength, a first variable wavelength light source 107, a second variable wavelength light source 108, a light branching device 109, a band-pass filter 110, a first photo-detector 111 for detecting the light having the setting wavelength, a variable wavelength band-pass filter 112, a second photo-detector 113, and a control circuit 114 connected to a terminal device. The setting wavelength is used for the communication line setting procedure.

In the light transmitter shown in FIG. 2, both variable wavelength light sources 107 and 108 may be a distributed Bragg-reflector (DBR) semiconductor laser whose oscillation wavelength can be varied by the change of the Bragg wavelength of the DBR area which is achieved by the injection of current into the DBR area. Such a semiconductor laser has been reported by 4. Kotaki et al, for example, from page 325 to page 327 of Electronics Letters, Vol 23, No. 7, published in 1987.

The variable wavelength band-pass filter 112 may be the type which employs the DBR area of, for example, the variable wavelength DBB type semiconductor laser whose wavelength bandwidth can be varied by the injection of current. Such a variable wavelength band-pass filter has been described in, for example, Japanese Patent Laid-Open No. 175025/1985.

Figure 3:
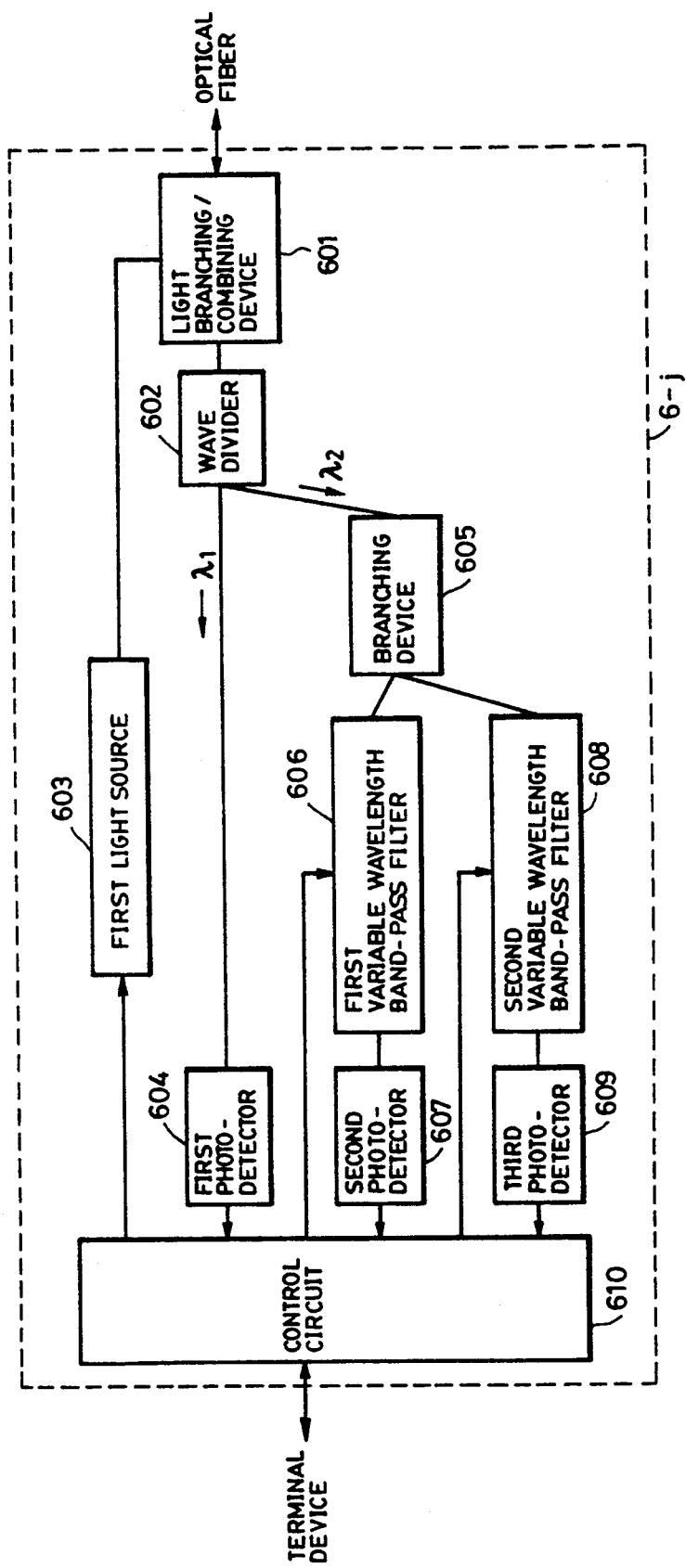
FIG. 3 is a block diagram of an optical receiver employed in the first embodiment.

FIG. 3 shows the configuration of the light receiver 6-j of FIG. 1. The light receiver 6-j includes a light branching/combining device 601, a wave divider 602 for separating light waves of different wavelengths from each other, a first light source 603 which may be a semiconductor laser for oscillating the light having the same wavelength as that of the first light source 106 of the light transmitter 1-i, i.e., the light having the setting wavelength, a first photo-detector 604 for detecting light having the setting wavelength $\lambda 1$, a branching device 605, first and second variable wavelength band-pass filters 606 and 608, second and third photo-detectors 607 and 609, and a control circuit 610 connected to a terminal device.

The variable wavelength band-pass filters 606 and 608 shown in FIG. 3 may be those having the same configuration as those of the variable wavelength band-pass filter 112 in the light transmitter 1-i shown in FIG. 2.

Figure 4:
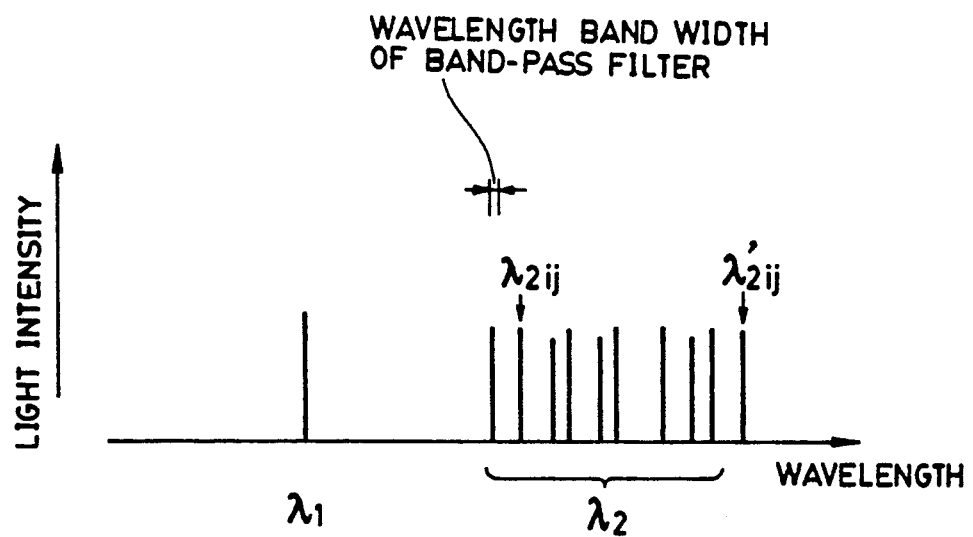
FIG. 4 shows the spectra of the light employed in the optical communication system according to the present invention.

Next, the wavelengths employed in the present embodiment will be described. As shown in FIG. 4, the wavelengths employed in the communication method of this embodiment are classified into two types: a setting wavelength $\lambda 1$ employed to set a communication line and a communication wavelength range $\lambda 2$ employed for actual communications. The wavelength in the communication wavelength range, which is used for actual communication, for example, between the light transmitter 1-i and the light receiver 6-j, is called a communication wavelength $\lambda 2ij$.

In the communication method which employs the setting wavelength $\lambda 1$, it is possible for all the light transmitters 1—1 to 1-n and all the light receivers 6-1 to 6-m to perform transmissions at least once within a certain period of time and to receive and understand the contents of the communication. Hence, the light transmitters 1—1 to 1-n each incorporate the first light source 106 and the first light isolator 103 (to transmit the light having the setting wavelength), as well as the band-pass filter 110 and the first photo-detector 111 (to receive the light having the setting wavelength), whereas the light receivers 6-1 to 6-m each incorporate the first light source (to transmit the light having the setting wavelength), as well as the wave divider 602 and the first photo-detector 604 (to receive the light having the setting wavelength).

The communications conducted using the communication wavelength range may be synchronous or asynchronous.

The procedure for performing communications from the light transmitter 1-i to the light receiver 6-j now will be described.

When the control circuit 114 receives a request of communication from the terminal device, the control circuit outputs a control signal to the variable wavelength band-pass filter 112 to sweep a predetermined bandwidth thereof shown in FIG. 4 to thereby detect an unused wavelength (this wavelength is called a first communication wavelength $\lambda 2ij$) from the communication wavelength range $\lambda 2$. Once the unused wavelength has been detected, the control circuit 114 adjusts the first variable wavelength light source 107 so that it emits light with the first communication wavelength $\lambda 2ij$ and then outputs, to an output modulating portion of the first variable wavelength light source 107, an originator code, a destination code, and a code representing the first communication wavelength $\lambda 2ij$ so that the first variable wavelength light source 107 repetitively transmits these codes.

The control circuit 114 includes a function for determining, from the control signal output to the variable wavelength band-pass filter 112, on which wavelength the communication wavelength has been set, within the communication wavelength range $\lambda 2$, and a function for memorizing the relationship between the control signal output to the wavelength adjusting portions of the first and second variable wavelength light sources 107 and 108 and the wavelengths of the light actually output from those light sources 107 and 108.

Subsequently, the control circuit 114 of the light transmitter 1-i controls the variable wavelength band-pass filter 112, again, to detect another unused wavelength (called a second communication wavelength $\lambda 2ij'$) from the communication wavelength range $\lambda 2$. Thereafter, the control circuit 114 outputs a control signal to the wavelength adjusting portion of the second variable wavelength light source 108 to cause the light source 108 to emit light with the detected second communication wavelength $\lambda 2ij'$, and then outputs, to an output modulating portion of the second variable wavelength light source 108, an originator code, a destination code, and a code representing the second communication wavelength $\lambda 2ij'$ so that the second variable wavelength light source 108 repetitively transmits those codes.

Thereafter, the light transmitter 1-i transmits the request for communication to the light receiver 6-j in accordance with the communication method which employs the setting wavelength $\lambda 1$ using the first light source 106, and then waits for the reply from the light receiver 6-j.

If the light receiver 6-j is communicating with another light transmitter 1-i' or if the terminal device connected to the light receiver 1-i is disabled for reception, the light receiver 6-j which has received the request for communication which uses the setting wavelength $\lambda 1$ sends a message to the light transmitter 1-i that it cannot accept the request for communication in accordance with the communication method which employs the setting wavelength $\lambda 1$ using its first light source 603.

Except for the above-described case, the light receiver 6-j conducts reception based on the following procedure.

First, the control circuit 610 of the light receiver 6-j outputs a control signal to the first variable wavelength band-pass filter 606 to detect the first communication wavelength $\lambda 2ij$ from the communication wavelength range $\lambda 2$. Thereafter, the control circuit 610 outputs a control signal to the second variable wavelength band-pass filter 608 to detect the second communication wavelength $\lambda 2ij'$.

Thereafter, the control circuit 610 fixes the bandwidths of the first and second variable wavelength band-pass filters 606 and 608 so that they respectively transmit the first and second communication wavelengths ($\lambda 2ij$ and $\lambda 2ij'$) and then transmits, to the light transmitter 1-i, a code which represents that preparation for the reception has been completed in accordance with the communication method which employs the setting wavelength $\lambda 1$ using the first light source 603.

Upon receipt of the information transmitted from the light receiver 6-j, the light transmitter 1-i starts transmission using the light of the first communication wavelength $\lambda 2ij$ which is emitted from the first variable wavelength light source 107.

During the communication, on the side of the light receiver 6-j, the control circuit 610 outputs a control signal to the first and second variable wavelength band-pass filters 606 and 608 so as to vary the central wavelengths of the bandwidths of the first and second variable wavelength band-pass filters 606 and 608 within the fine wavelength range, which variations of the wavelengths of the first and second communication wavelengths ($\lambda 2ij$ and $\lambda 2ij'$) are detected so as to ensure an optimum reception state.

In a case when the communication wavelength varies or when the communication wavelength of another light transmitter 1-i' approaches that of the light transmitter 1-i during the communication, radio interference occurs, and reception in the light receiver 6-j of an accurate communication signal thus becomes impossible. In that case, the light receiver 6-j sends to the light transmitter 1-i a request for switching over the communication wavelength to the second communication wavelength $\lambda 2ij'$ using the setting wavelength $\lambda 1$ from the first light source 603.

Upon detection of the request for changing the communication wavelength from the light having the setting wavelength $\lambda 1$ received by the first photo-detector 111, the light transmitter 1-i suspends the communications which employ the light having the first communication wavelength $\lambda 2ij$ emitted from the first variable wavelength light source 107 and starts communication which employs the second communication wavelength $\lambda 2ij'$ (from the second variable wavelength light source 108).

Thereafter, the control circuit 114 outputs a control signal to the variable wavelength band-pass filter 112 and thereby detects another unused wavelength (which is called a new first communication wavelength $\lambda 2ij''$) from the communication wavelength range $\lambda 2$. Next, the control circuit 114 outputs a control signal to the wavelength adjusting portion of the first variable wavelength light source 107 to set the oscillation wavelength of the light source 107 to the new first communication wavelength $\lambda 2ij''$, and then outputs, to the output modulating portion of the first variable wavelength light source 107, an originator code, a destination code, and a code representing the new first communication wavelength $\lambda 2ij''$ so that the first variable wavelength light source 107 repetitively transmits these codes. Thereafter, the light transmitter 1-i transmits to the light receiver 6-i a message which indicates the setting of the new communication wavelength using the setting wavelength $\lambda 1$.

Upon receipt of the message transmitted using the setting wavelength $\lambda 1$, the control circuit 610 of the light receiver 6-j outputs a control signal to the light variable wavelength band-pass filter 606 to detect the new first communication wavelength $\lambda 2ij''$ and to fix the bandwidth of the filter 606 to the detected wavelength. Thereafter, the light receiver 6-j sends to the light transmitter 1-i a message that the new first communication wavelength λ2ij" has been detected using the setting wavelength λ1.

Thereafter, communications which are free from radio interference and which use the two communication wavelengths continue.

Figure 5:
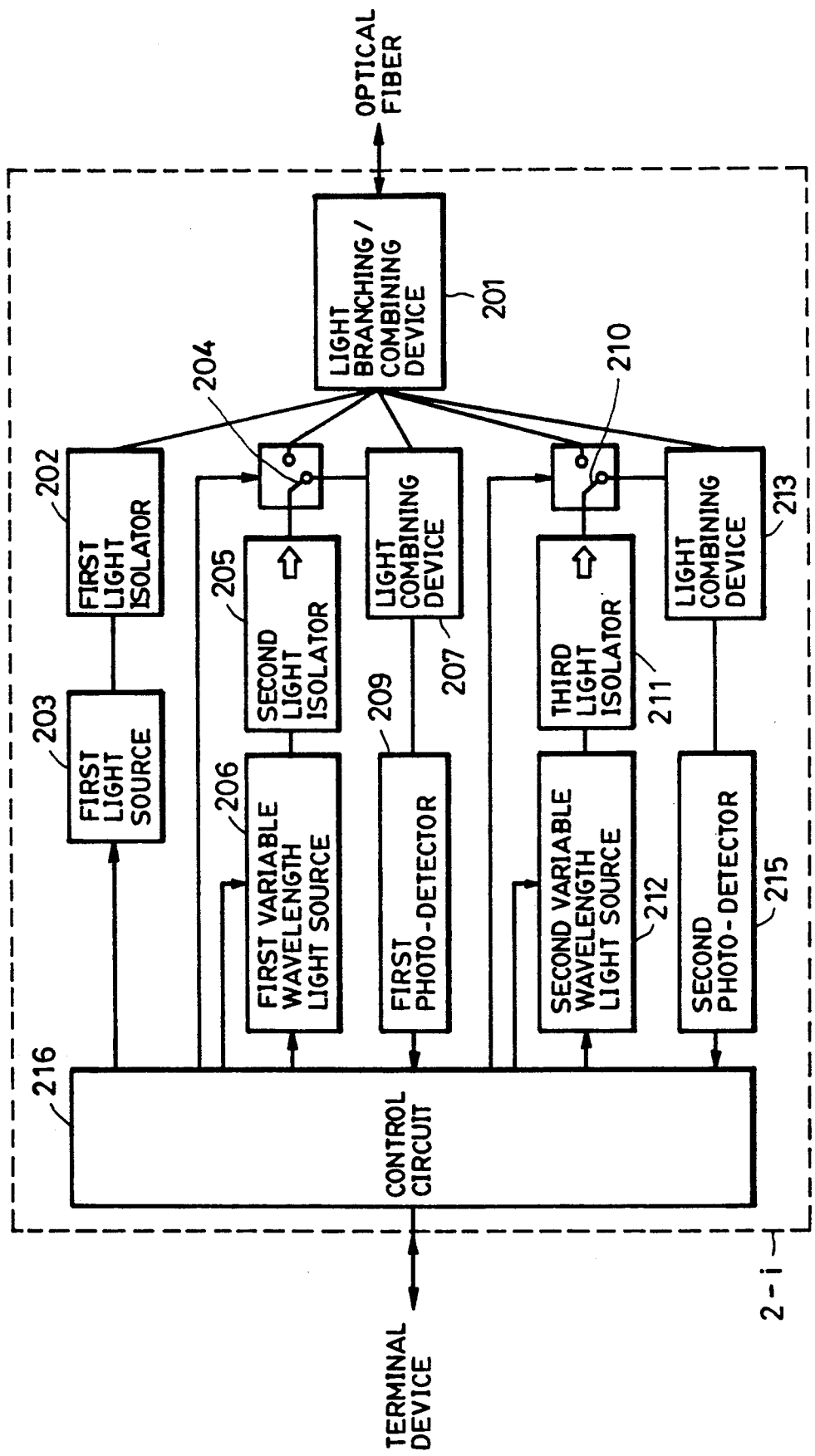
FIG. 5 is a block diagram of a modification of the optical transmitter employed in the first embodiment.

FIG. 5 shows a light transmitter 2-i which is a modification of the light transmitter 1-i. The light transmitter 2-i includes a light branching/combining device 201, first, second and third light isolators 202, 205, 211, a first light source 203 which may be a semiconductor laser, light switches 204 and 210 for switching-over the direction of transmission of light, first and second variable wavelength light sources 206 and 212, light combining devices 207 and 213, first and second photo-detectors 209 and 215, and a control circuit 216. The first and second variable wavelength light sources 206 and have the same configuration as those of the first and second variable wavelength light sources 107 and 108 employed in the light transmitter 1-i shown in FIG. 2. The first and second variable wavelength light sources 206 and each have a wavelength adjusting portion for shifting the wavelength of the light output from the light source and an output light modulating portion for changing the intensity of light output from the light source. The light switches 204 and 210 are each switched over to select one of two directions in which light propagates by means of the control signal from the control circuit 216.

The operation of the light transmitter 2-i is basically the same as that of the light transmitter 1-i shown in FIG. 2. However, unlike the light transmitter 1-i, the light transmitter 2-i adopts a method in which an unused wavelength is detected from the communication wavelength range λ2 and in which the wavelength of the light output from the light transmitter 2-i is fixed to the detected unused wavelength.

The method adopted by the light transmitter 2-i will be described below in detail. The control circuit 216 outputs a control signal to the light switch 204 so as to pass the light emitted from the first variable wavelength light source 206 to the first photo-detector 209 through the second light isolator 205, the light switch 204, and the light combining device 207. This makes it possible for the first photo-detector 209 to simultaneously receive the light emitted from the first variable wavelength light source 206 and the light which reaches the first photo-detector 209 from the transmission line through the light branching/combining device 201 and the light combining device 207. Since both lights are coherent, simultaneous reception of the two lights by the first photo-detector 209 creates heterodyne light from the two lights and thereby produces an electrical signal having a frequency equal to the difference in the frequency of the two original lights.

Even when care is taken for the high-frequency characteristics, the bandwidth of an electrical circuit is generally limited to several tens of GHz. A bandwidth of, for example, 50 GHz indicates that a beat signal produced when light with a wavelength of 800 nm is combined with that having a wavelength close to 800 nm by ±0.106 nm cannot be detected. That is, the above-described configuration is equivalent to a band-pass filter which transmits a wavelength band of 2 Å.

Hence, the control circuit 216 outputs a control signal to the wavelength adjusting portion of the first variable wavelength light source 206 to sweep the output wavelengths of the first variable wavelength light source 206 within the communication wavelength range λ2 and thereby detects the output wavelength of the light source 206 at which no beat signal is output from the first photo-detector 209. Thereafter, the control circuit 216 fixes the output wavelength of the first variable wavelength light source 206 to the wavelength detected to determine the communication wavelength and adjusts the light source 206 to emit light with the detected wavelength. After the adjustment, the light switch 204 is switched over again to its original state, and the first photo-detector 209 thus serves as the photo detector for the setting wavelength λ1.

The above-described operation is also conducted with respect to the second photo-detector 215. In that case, the second communication wavelength is detected, and the output wavelength of the second variable wavelength light source 212 is adjusted to detected the second communication wavelength.

Figure 6:
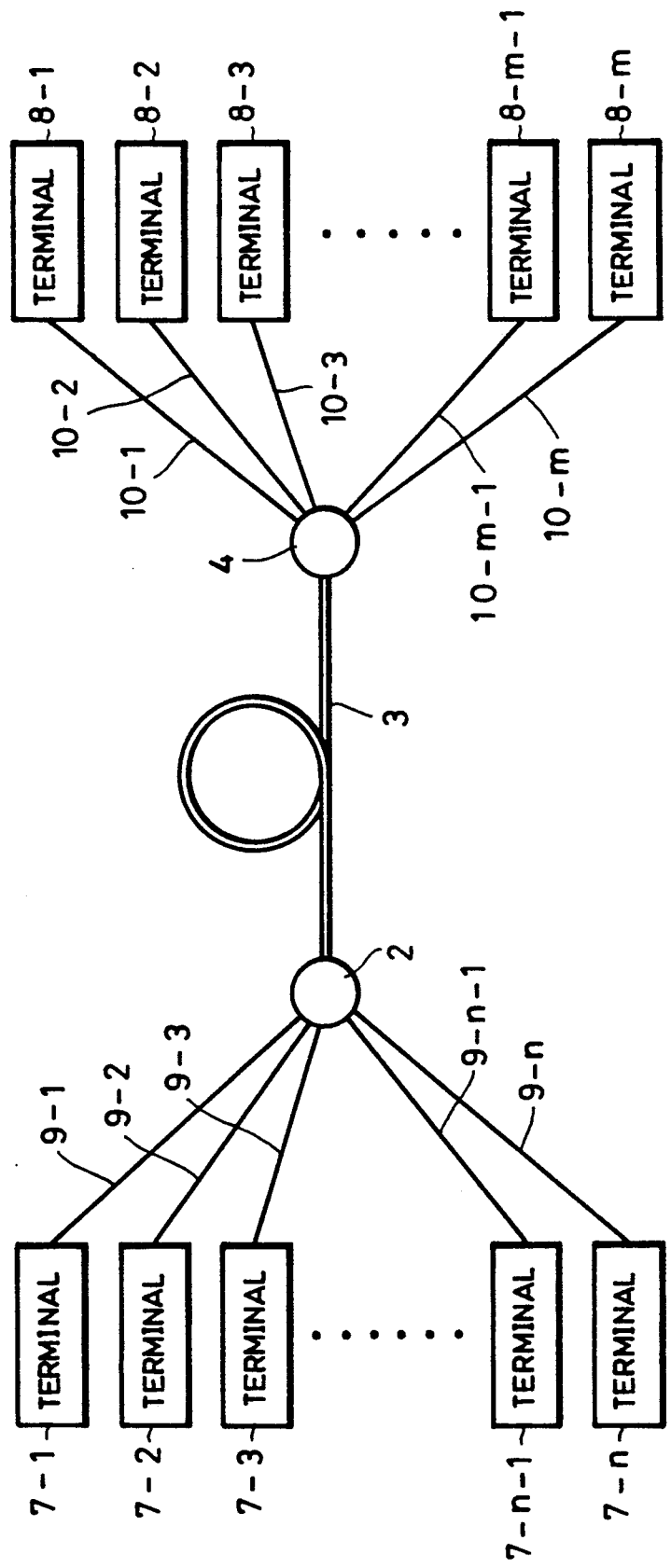
FIG. 6 is a block diagram of a second embodiment of the optical communication system according to the present invention.

FIG. 6 is a block diagram of a second embodiment of the optical communication system according to the present invention. In FIG. 6, reference numerals 7-1 to 7-n and 8-1 to 8-m denote optical communication terminals; 3, 9-1 to 9-n, and 10-1 to 10-m denote optical fibers which serve as optical transmission lines; and 2 and 4 denote optical star couplers.

Figure 7:
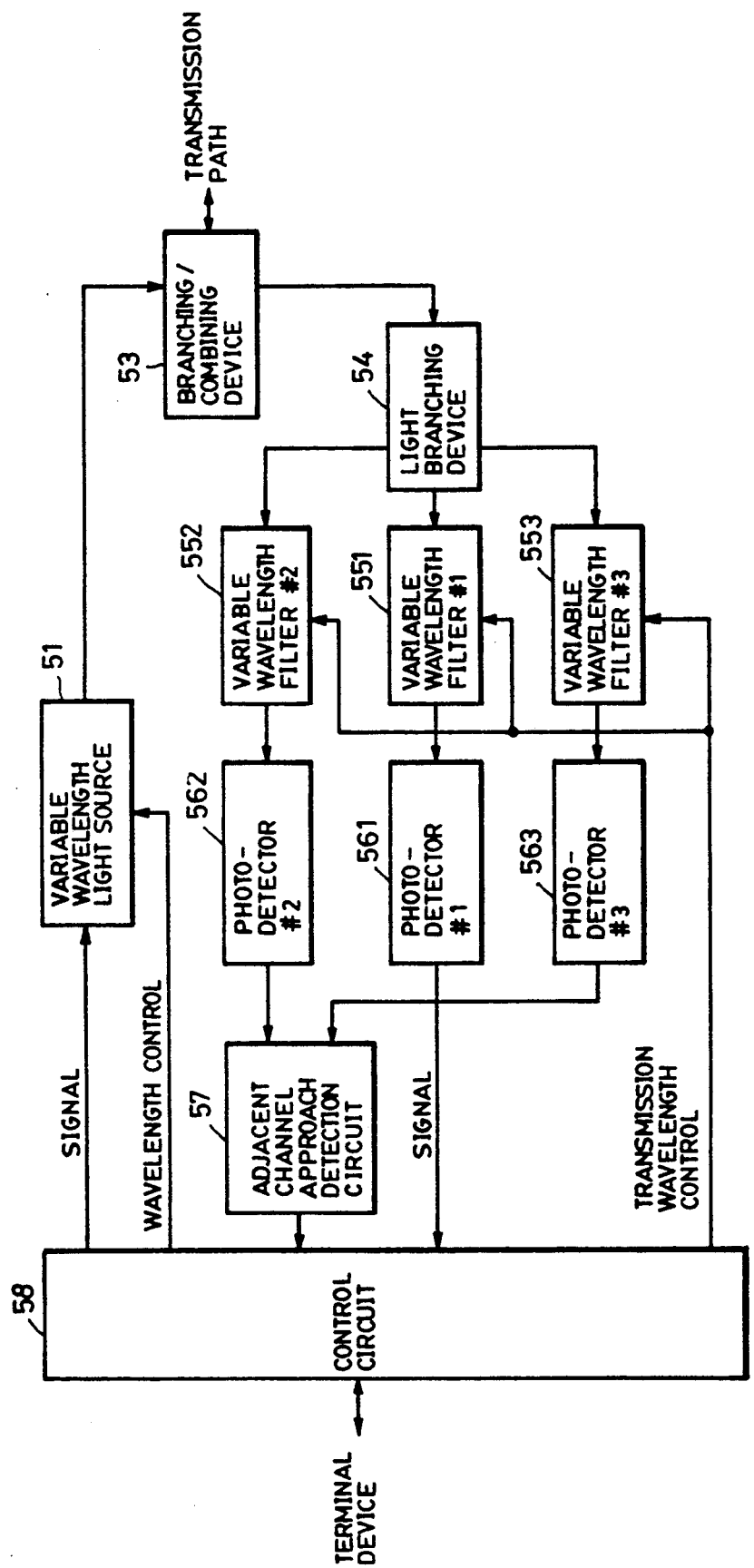
FIG. 7 is a block diagram of an optical transceiver employed in the second embodiment.

FIG. 7 is a schematic view of an optical transceiver of the terminals 7-1 to 7-n and 8-1 to 8-m shown in FIG. 6. The optical transceiver includes a variable wavelength light source 51 which may be a semiconductor laser whose oscillation wavelength can be externally varied, a light branching/combining device 53 for directing the light signal from the variable wavelength light source 51 to the transmission line and to a light branching device 54 and for passing the multiplex signal which reaches the device 53 from the transmission line to the light branching device 54, a light branching device 54 for distributing the light from the light branching/combining device 53 to variable wavelength filters 551, 552, and 553, an adjacent channel approach detection circuit 57 for extracting required information from the signals from photo-detectors 562 and 563, a control circuit 58 for transmitting the data from a terminal device, for receiving the data from the transmission line, and for controlling the variable wavelength light source 51 and variable wavelength filters 551 to 553 so as to eliminate radio interference with other terminals, variable wavelength band-pass filters 551 to 553 which can be externally controlled to change the wavelength ranges of transmitting light thereof, and photo-detectors 561 to 563.

Both the light branching/combining device 53 and the light branching device 54 may comprise a half mirror or a beam splitter. The variable wavelength light source 51 may be a variable wavelength DBR semiconductor laser with a DBR mirror of the type in which the Bragg wavelength of the DBR area can be changed by the injection of carriers thereinto and in which the wavelength of oscillation can be continuously changed by adjusting the amount of carriers injected into the DBR area. Such a semiconductor laser has been described in the aforementioned Electronics Letters.

The variable wavelength light source 51 incorporates a wavelength adjusting portion for varying the oscillation wavelength thereof and an output light modulating portion for conducting modulation of the intensity of an output light thereof.

In the case of the variable wavelength DBR semiconductor laser, the DBR portion serves as the wavelength adjusting portion, and the active area corresponds to the output light modulating portion.

The variable wavelength band-pass filters 561 to 563 have the same configuration as those of the variable wavelength band-pass filters 606 and 608 employed in the above-described first embodiment and thus employ the variable wavelength DBR whose Bragg wavelength is varied by the injection of carriers.

Figure 8:
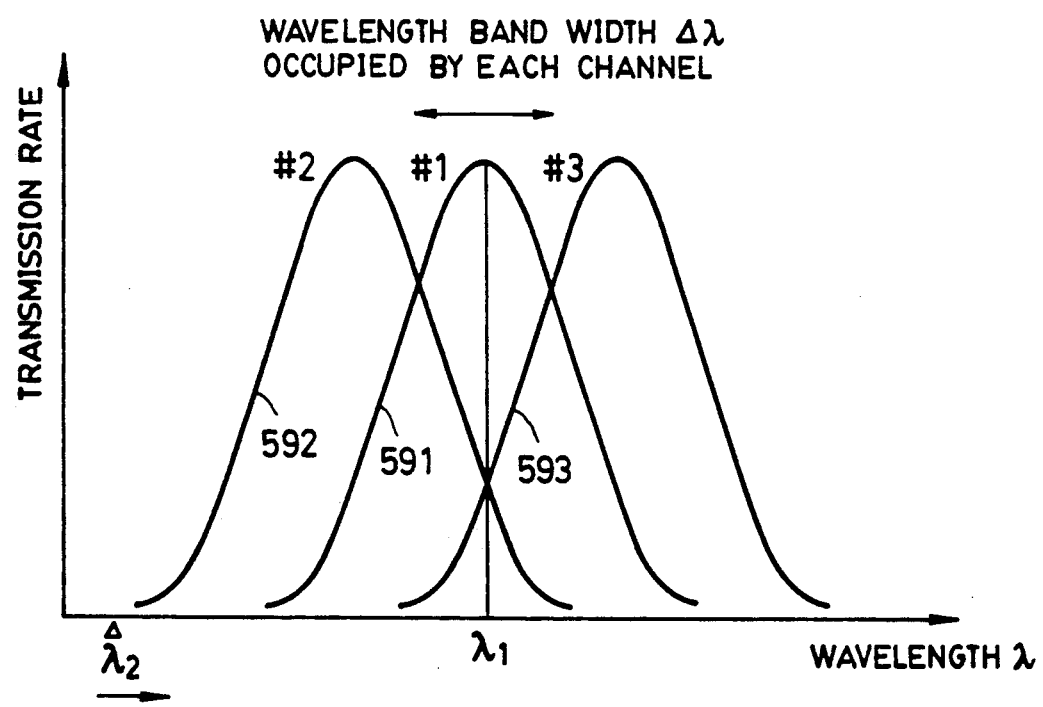
FIG. 8 shows the transmission rates of the filters shown in FIG. 7.

FIG. 8 is a graph showing the relationship among the wavelength bandwidths of the variable wavelength band-pass filters 561 to 563 shown in FIG. 7. In FIG. 8, curves 591 to 593 respectively denote the transmission characteristics of the variable wavelength band-pass filters 561 to 563.

The variable wavelength filters 561 to 563 are constructed such that, when the bandwidths thereof are externally varied, the three bandwidths can be simultaneously varied in the same direction by the same wavelength range while the relationship among the bandwidths is maintained.

Next, the operation of the second embodiment will be described with reference to FIGS. 6 to 8.

The following example shows the communication from the terminal 7-1 to the terminal 8-3 which is conducted using light having the wavelength $\lambda 1$ and the communication from the terminal 7-2 to the terminal 8-2 which is conducted using light having the wavelength $\lambda 2$. However, the present embodiment is not limited to this example. Rather, exactly the same control can be performed for communications between any combination of terminals.

It is assumed that, although the wavelengths $\lambda 1$ and $\lambda 2$ are close to each other, they are separated from each other by the bandwidths required for the individual communications, so that radio interference does not occur.

In the light transceiver of the terminal 7-1 shown in FIG. 7, the light signal having the wavelength $\lambda 1$ which is emitted from the variable wavelength light source 51 is divided into two portions by the light branching/combining device 53, the first one portion being transmitted to the transmission line and the second portion being transmitted to the light branching device 54. In the light branching device 54, the light from the light branching/combining device 53 is further divided into three portions which respectively reach the first, second and third variable wavelength filters 551, 552 and 553. The first variable wavelength filter 551 is controlled by the control signal from the control circuit 58 such that the center of the bandwidth thereof coincides with the wavelength $\lambda 1$. In turn, the first photo-detector 561 outputs a signal whose amplitude is large, while the second and third photo-detectors 562 and 563 output signals which correspond to the respective amplitudes of the variable wavelength filters 552 and 553 relative to the wavelength $\lambda 1$, as shown in FIG. 8.

In the light transceiver of the terminal 8-3, light having wavelengths $\lambda 1$ and $\lambda 2$ enters the light branching/combining device 53 from the transmission line, passes through the light branching device 54, and then, reaches the first, second and third variable wavelength filters 551, 552 and 553. Since the center of the wavelength bandwidth of the first variable wavelength filter 551 is set to the wavelength $\lambda 1$, the light having the wavelength $\lambda 2$ is attenuated and only the light having the wavelength $\lambda 1$ is thus converted into an electrical signal by the first photo-detector 561. The resultant electrical signal is transmitted to the terminal device through the control circuit 58.

As stated above, the semiconductor laser which acts as the variable wavelength light source 51 is characterized in that the oscillation wavelength thereof readily varies due to changes in temperature. The following description explains the operation of the second embodiment when the wavelength $\lambda 2$ of the signal transmitted from the terminal 7-2 has been varied such that it approaches the wavelength $\lambda 1$.

As light having the wavelength $\lambda 2$ enters the bandwidth of the second variable wavelength filter 552, the output of the second photo-detector 562 increases, whereas the output of the third photo-detector 563 remains constant. It is therefore possible for the adjacent channel approach detecting circuit 57 to detect that a wavelength shorter than the wavelength $\lambda 1$ is approaching the wavelength $\lambda 1$ by examining the outputs of the two photo-detectors. The adjacent channel approach detecting circuit 57 transmits the detection data to the control circuit 58.

The control circuit 58 continuously shifts the wavelength $\lambda 1$ of the variable wavelength light source 51 in a direction to increase the wavelength in accordance with the detection data using the wavelength control signal so as to eliminate radio interference with the wavelength $\lambda 2$ which is approaching the wavelength $\lambda 1$. At the same time, the control circuit 58 causes the center of the transmitting wavelength range of the first variable wavelength filter 551 to coincide with the shifted wavelength $\lambda 1$ using the transmitting wavelength control signals for the first, second and third variable wavelength filters 551, 552 and 553.

In the terminal 8-3 which is receiving the wavelength $\lambda 1$, as the wavelength $\lambda 1$ shifts in the terminal 7-1 to eliminate radio interference, the output of the first photo-detector 561 decreases. However, since the first variable wavelength filter 551 is controlled by the control circuit 58 of the terminal 8-3 by means of the transmitting wavelength control signal to shift the center of the transmitting wavelength range thereof such that the output from the first photo-detector 61 is maximized, a decrease in the output of the first photo-detector 561 is avoided. This allows the terminal 8-3 to receive the signal from the terminal 7-1 even when the wavelength thereof varies.

Thus, it is possible to eliminate radio interference in the terminal 7-1 when the communication wavelength of the terminal 7-2 varies and approaches the communication wavelength of the terminal 7-1. In the terminal 8-3, it is possible to continue receiving the signal from the terminal 7-1 in a tuned state.

In a case when a wavelength $\lambda 2$, which is longer than the wavelength $\lambda 1$, is approaching the wavelength $\lambda 1$, the output of the third photo-detector 563 increases. The increased output of the third photo-detector 563 is detected by the adjacent channel approach detecting circuit 57.

In a case when, only $\lambda 1$ varies while $\lambda 2$ remains the same, or when both $\lambda 1$ and $\lambda 2$ vary, communications also can be maintained by the above-described function without any occurrence of radio interference.

Figure 9:
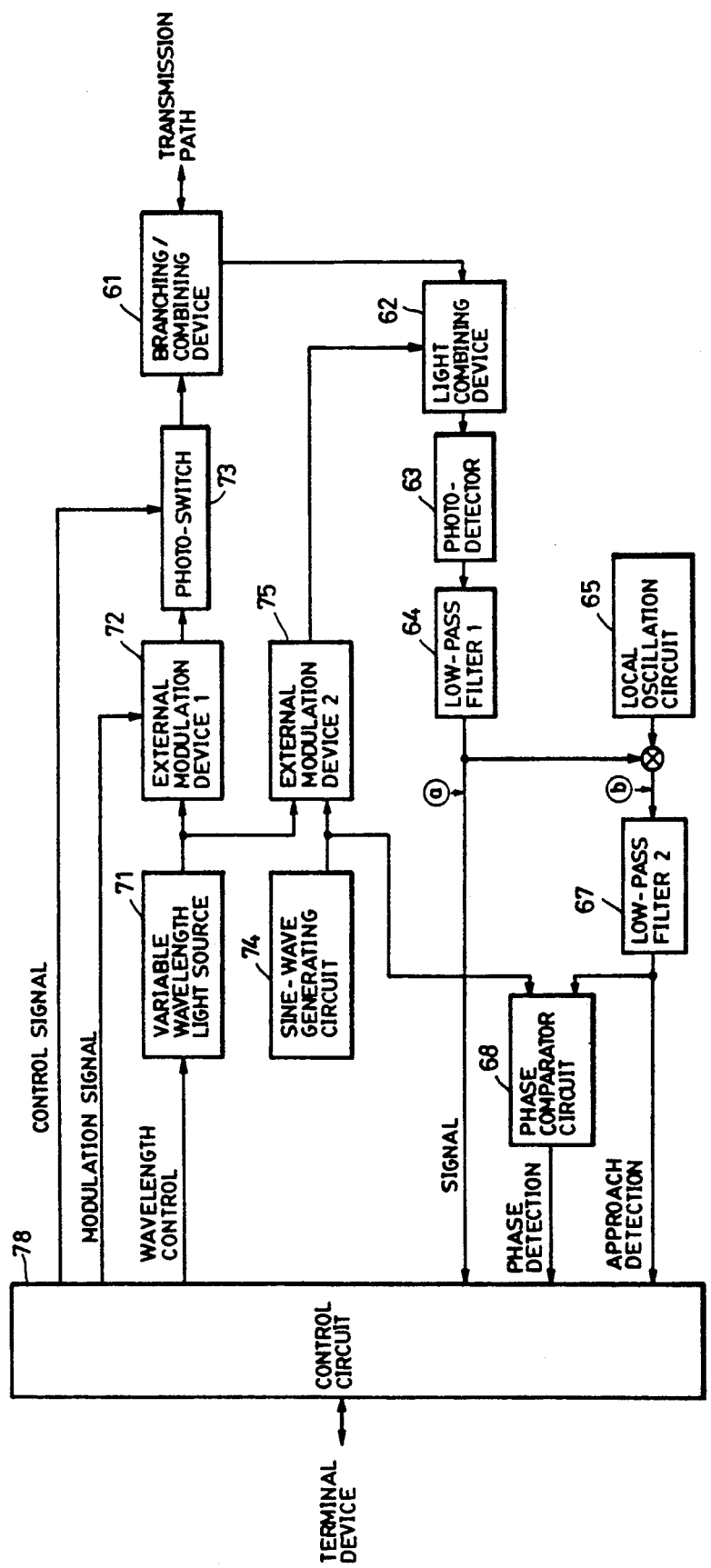
FIG. 9 is a block diagram of a modification of the optical transceiver employed in the second embodiment.

FIG. 9 is a block diagram of a modification of the light transceiver of a terminal shown in FIG. 6. This light transceiver is also suitable for use in the wavelength-division multiplexing optical communication system shown in FIG. 6.

The light transceiver shown in FIG. 9 includes a control circuit 78 which controls the entirety of the light transceiver, like the control circuit 58, a light branching/combining device 61, a light combining device 62 for mixing the light from a second external modulation device 75 with the light from the light branching/combining device 61, a photo-detector 63, a low-pass filter 64 whose cutoff frequency is, for example, 5 GHz, a local oscillator 65 for oscillating a signal having a frequency of, for example, 3 GHz, a low-pass filter 67 whose cutoff frequency is, for example, about 1 GHz, a phase comparison circuit 68 for detecting the phase difference between the signal from a sine wave generating circuit 74 and a signal from the low-pass filter 67, a variable wavelength light source 71, a first external modulation device 72 for frequency- or phase-modulating the light from the variable wavelength light source 71, a photo-switch switch 73, a sine wave generating circuit 74 for generating a sine wave signal having, for example, 100 kHz, and a second external modulation device 75.

In this embodiment, it is assumed that the signal from each terminal has a frequency bandwidth ranging from 1 MHz to 1 GHz.

The operation of the light transceiver shown in FIG. 9 will be described below with reference to FIGS. 10A, 10B, 11A, and 11B. The following example shows the communication from the terminal 7-1 to the terminal 8-3 which is conducted using the wavelength λ1 and the communication from the terminal 7-2 to the terminal 8-2 which is conducted using the wavelength λ2, like the case shown in FIG. 7.

Figure 10A:
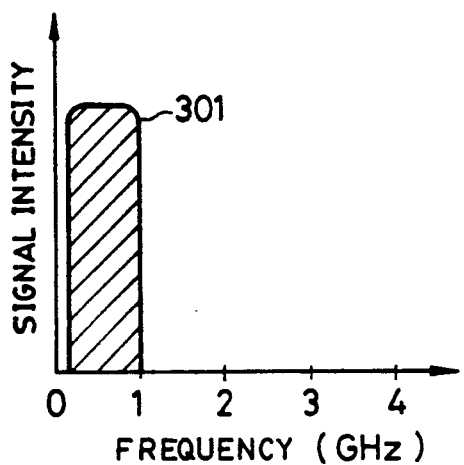
FIGS. 10A, 10B, 11A, and 11B show the frequency spectra of the signals detected by the optical transceiver shown in FIG. 9.
Figure 10B:
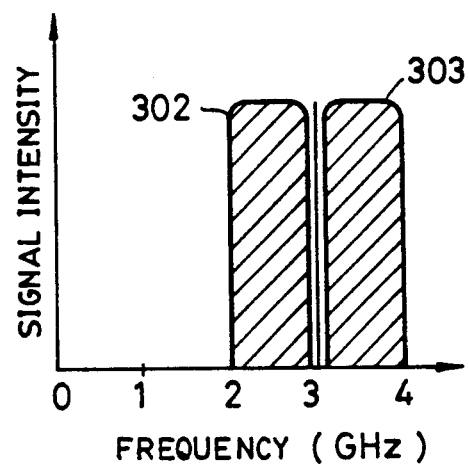
Figure 11A:
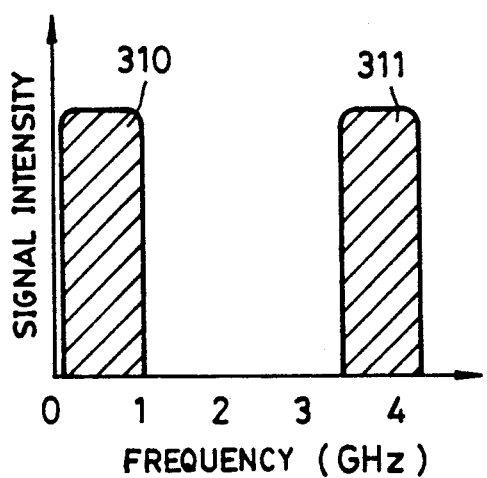
Figure 11B:
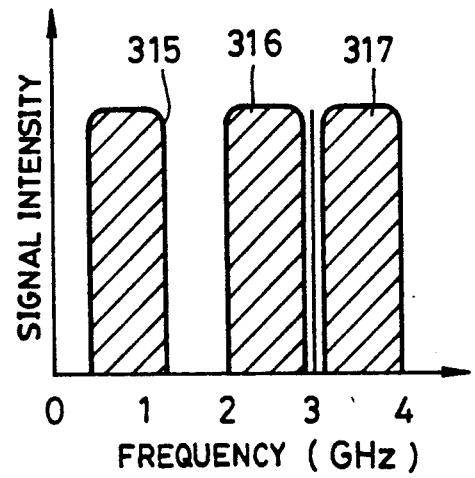

In FIGS. 10A, 10B, 11A, and 11B, which respectively show the frequency spectra of the signals at the points indicated by the encircled 'a' and the encircled 'b' in FIG. 9, FIGS. 10A and 10B show the frequency spectra obtained when the wavelength of an adjacent channel is not approaching that of the originator while FIGS. 11A and 11B show the frequency spectra obtained when the wavelength of an adjacent channel is approaching that of the originator.

First, the operation of the terminal which is in a transmitting state will be described with reference to FIGS. 9, 10A, and 10B. The following example shows the case in which the wavelength of an adjacent channel is not approaching that of the originator.

As stated above, the signal output from the terminal which is in a transmitting state has a frequency bandwidth ranging from 1 MHz to 1 GHz. The light signal of the wavelength λ1, which is emitted from the variable wavelength light source 71 and which is within the above-described wavelength range, is modulated by the first external modulation device 72 using the control signal from the control circuit 78, and the resultant signal is output to the photo-switch 73. Since the photo-switch 73 in the terminal which is in the transmitting state is on, the light input to the photo-switch 73 passes through the photo-switch 73 and is sent out to the transmission line through the light branching/combining device 61.

Part of the light which has passed through the photo-switch 73 is branched by the light branching/combining device 61 and then reaches the light combining device 62.

Part of the light from the variable wavelength light source 71 is sent to the second external modulation device 75 where it is frequency- or phase-modulated using the signal having a frequency of 100 KHz which is output from the sine wave generating circuit 74. The resultant signal reaches the light combining device 62.

The light combining device 62 mixes the light from the light branching/combining device 61 with the light from the second external modulation device 75 and sends the resultant signal to the photo-detector 63. The photo-detector 63 converts the received light into an electrical signal. Hence, the signal output from the photo-detector 63 is a difference frequency signal (beat signal) of the light signal input thereto. The signal from the photo-detector 63 is output to the low-pass filter 64. Since the signal output to the low pass filter 64 contains signals generated from the same light source, but which are modulated using different electrical signals, the low-pass filter 64 conducts homodyne detection of these signals.

Thus, the signal output to the point indicated by the encircled 'a' in FIG. 9 from the low-pass filter 64, excluding the sine wave component of 100 KHz, has the same frequency spectrum as that of the signal output from the terminal, as indicated by signal 301 in FIG. 10A. The signal 301 is input to the control circuit 78.

Also, the signal 301 is mixed with the signal generated by the local oscillation circuit 65 which outputs a frequency of 3 GHz, and the resultant signal is input to the low-pass filter 67. The signal at the point indicated by the encircled 'b' in FIG. 9 is a sum and difference signal between the signal having the frequency spectrum shown by signal 301 in FIG. 10A at the point 'a' and the signal having a central frequency of 3 GHz, and thus, has a frequency spectrum in which two sidebands of about 1 GHz each exist on the two sides of 3 GHz, as indicated by signals 302 and 303 in FIG. 10B.

Since the low-pass filter 67 has a cutoff frequency of 1 GHz, it attenuates the signals 302 and 303 having the frequency spectra shown in FIG. 10B, and produces no signal.

Thus, in a case when the wavelength of the adjacent channels is not approaching, the low-pass filter 67 produces no signal and thus, no approach detection signal is output to the control circuit 78.

It is now assumed that the wavelength λ2 of the light which is being transmitted from the terminal 7-2 to the terminal 8-2 varies and is approaching the wavelength λ1 in that state.

In that state, the light combining device 62 receives both the light having the wavelength λ1 and the light having the wavelength λ2 from the light branching/combining device 61. It is also assumed that the distance by which the wavelength λ2 approaches the wavelength λ1 is about 4 GHz in terms of frequency difference. In that case, the photo-detector 63 outputs the signal obtained by conducting homodyne detection on the signals modulated using the two different signals and having the wavelength λ1, as well as the signal (heterodyne detected signal) having a beat frequency obtained when the light of the wavelength λ2 is combined with the light emitted from the second external modulation device 75. Hence, the spectrum of the signal at the point indicated by 'a' contains a signal 310 resulting from the homodyne detection and a signal 311 resulting from the heterodyne detection, as shown in FIG. 11A.

The mixture of the signals 310 and 311 with the signal generated by the local oscillation circuit 65 and having a frequency of 3 GHz produces signals 316 and 317 whose central frequency is 3 GHz and a difference signal 315 between the signal 311 and the signal having the frequency of 3 GHz, as shown in FIG. 11B. Since the difference signal 315 has a frequency which is lower than the cutoff frequency of the low-pass filter 67, it passes through the low-pass filter 67 and is input to the control circuit 78 as an approach detection signal. Thus, it is determined by the control circuit 78 from the detection of the output of the low-pass filter 67 that the wavelength $\lambda 2$ is approaching the wavelength $\lambda 1$.

Since the light from the external modulation device 75 is modulated using a sine wave having a frequency of 100 KHz, in the case when the wavelength $\lambda 2$ is shorter than the wavelength $\lambda 1$, that is, in the case when a wavelength $\lambda 2$ having a higher frequency than the wavelength $\lambda 1$ is approaching the wavelength $\lambda 1$, the signal output from the low-pass filter 67 is modulated such that it is out of phase with the sine wave signal due to the sine wave signal generated by the sine wave generation circuit 74.

In the case when the wavelength $\lambda 2$ is longer than the wavelength $\lambda 1$, that is, in the case when a wavelength $\lambda 2$ having a lower frequency than the wavelength $\lambda 1$ is approaching the wavelength $\lambda 1$, the signal output from the low-pass filter 67 is modulated such that it is in phase with the sine wave signal due to the sine wave signal generated by the sine wave generation circuit 74.

Hence, the control circuit 78 determines the direction from which the wavelength $\lambda 2$ is approaching the wavelength $\lambda 1$, from the results of the comparison conducted by the phase comparison circuit 68.

Consequently, the control circuit 78 continuously shifts the wavelength of the light output from the variable wavelength light source 71 from the wavelength $\lambda 1$ in a direction in which it is separated from the approaching wavelength.

Next, the operation of the terminal 8-3 which is receiving the light having the wavelength $\lambda 1$ will be described.

Like the terminal 7-1, the terminal 8-3 incorporates the light transceiver portion shown in FIG. 9. When the terminal 8-3 is in a reception state, the light having the wavelength $\lambda 1$ and the light having the wavelength $\lambda 2$ are received by the light branching/combining device 61 from the transmission line. In the terminal which is in a light receiving state, the optical switch 73 is off and the light from the first external modulation device 72 is thereby blocked. Hence, the light which is received by the light branching/combining device 61 is the light which has reached the light branching-combining device 61 from the transmission line.

The control circuit 78 controls the variable wavelength light source 71 such that it outputs light having substantially the same wavelength as the wavelength $\lambda 1$. The light output from the light source 71 is modulated by the external modulation device 75, and the resultant signal is output to the light combining device 62.

The light combining device 62 mixes the light signal received by the light branching/combining device 61 from the transmission line with the light from the second external modulation device 75 and sends the combined signal to the photo-detector 63. The photo-detector 63 performs heterodyne detection on the signal input thereto and outputs the resultant signal to the low-pass filter 64.

Since the difference in the wavelength between the light signal from the terminal 7-1 and the signal from the variable wavelength light source 71 is substantially zero, the photo-detector 63 outputs a signal having substantially the same frequency spectrum as that of the signal output from the terminal 7-1, that is, a signal having a frequency bandwidth ranging from 1 MHz to 1 GHz. The signal output from the photo-detector 63 thus passes through the low-pass filter 64 having a cutoff frequency of 5 GHz.

The light from the terminal 7-2 has the wavelength $\lambda 2$. Since it is controlled by the above-described function of the terminal 7-1 that the light having the wavelength $\lambda 1$ and the light having the wavelength $\lambda 2$ do not approach each other by 5 GHz or more, the beat signal produced when the light from the light source 71 is combined with the light having the wavelength $\lambda 2$ does not pass through the low-pass filter 64.

Since the light which has passed through the second external modulation device 75 has been modulated using a signal having a frequency of 100 KHz, as stated above, the frequency spectrum at the point 'a' has a line spectrum at 100 KHz. Hence, the frequency spectrum at the point 'b' has a sideband separated from 3 GHz by 100 KHz. However, as stated above, since the frequency bandwidth of the signal from the terminal ranges from 1 MHz to 1 GHz, the data from the terminal 7-1 is not affected by the signal having a frequency of 100 KHz. Thus, reception of the signal from the terminal 7-1 is made possible by the passage of the signal output from the low-pass filter 64 through the band-pass filter having a bandwidth ranging from 1 MHz to 1 GHz. The control circuit 78 transmits the received signal to a terminal connected thereto.

When the wavelength $\lambda 1$ varies due to the radio interference avoiding function of the terminal 7-1, a difference in the wavelength occurs between the light generated by the variable wavelength light source 71 and the light sent from the terminal 7-1, and the photo-detector 63 thus generates a beat signal. The control circuit 78 controls the wavelength of the oscillation of the variable wavelength light source 71 such that no beat signal is generated, by which the signal from the terminal 7-1 can be still received even when the wavelength thereof varies. This control is the same as the above-described one.

As will be understood from the foregoing description, in the present embodiment, since the terminal which is in a transmitting state is capable of monitoring both the light from the originating terminal and that from the remote terminal due to homodyne/heterodyne detection, the difference in the wavelength between the light employed in the originating terminal and that employed by an adjacent terminal can be reduced to 5 GHz at a minimum in terms of frequency.

This enables the degree of wavelength-division multiplexing of the optical communication system to be greatly enhanced.

Although the present invention has been described in its preferred form, it is understood that the present invention is not limited to the specific embodiments thereof, but various changes and modifications may be made without departing from the spirit and scope thereof.

For example, whereas the communication system which employs a star coupler has been described in the above-described embodiments, the present invention can be applied to a communication system of any type, such as a bus, star or loop type.

Furthermore, the present invention also can be applied to a system which adopts space propagation as a transmission medium instead of an optical fiber.

Furthermore, the variable wavelength light source or the variable wavelength filter employed in the above-described embodiments can be replaced by any other device which has the same function.

In the configuration shown in FIG. 7, discrete figures have been used to describe the oscillation frequency of the sine wave generating circuit and the local oscillation circuit, the cutoff frequency of the low-pass filter, as well as the frequency band of the signal to be transmitted. However, these figures have been used for the ease of description, and the present invention thus can be applied to any configuration which is based on the same principle.

Each of the elements shown in block outline in FIGS. 1-3, 5-7, and 9 are standard, well known items; and their specific construction and operation is not part of nor critical to the disclosure of the invention or to the best mode for carrying out the invention.

What is claimed is:

1. A method of conducting communications using an optical communication system that includes a plurality of light transceivers mutually connected by means of a transmission line, said method comprising the steps of:
   detecting, from a predetermined frequency range, first and second wavelengths in a first light transceiver, which wavelengths are different from each other and which have not been used by other light transceivers;
   conducting communications between the first light transceiver and a second light transceiver using light having the first wavelength;
   transmitting the light having the first wavelength and the light having the second wavelength through a common transmission line; and
   conducting communications between the first light transceiver and the second light transceiver using light having the second wavelength when the quality of the communications using the light having the first wavelength deteriorates.

2. The method according to claim 1, further comprising the steps of:
   detecting, from the predetermined wavelength range, a third wavelength which is different from the first and second wavelengths and which has not been used by other light transceivers; and
   conducting communications between the first light transceiver and the second light transceiver using light having the third wavelength when the quality of the communications using the light having the second wavelength deteriorates.

3. A light transceiver for use with an optical communication system that includes a plurality of light transceivers mutually connected to each other by means of a transmission line, said transceiver comprising:
   detecting means for detecting, from a predetermined wavelength range, first and second wavelengths which are different from each other and which have not been used by other light transceivers in the optical communication system;
   a first light source for transmitting a light signal using light having the first wavelength;
   a second light source for transmitting a light signal using light having the second wavelength;
   a common transmission line for transmitting the light having the first wavelength and the light having the second wavelength; and
   control means for selectively operating said first and second light sources in accordance with a command signal sent from other light transceivers in the optical communication system.

4. The light transceiver according to claim 3, wherein said detecting means comprises a variable wavelength band-pass optical filter for filtering light signals sent from other light transceivers in the optical communication system, and a photo-detector for receiving a light signal which has passed through said filter.

5. The light transceiver according to claim 3, further comprising a third light source for transmitting a light signal using light having a predetermined third wavelength for communication between all the light transceivers in the optical communication system, and light receiving means for receiving the light signal having the third wavelength.

6. The light transceiver according to claim 3, wherein each of said first and second light sources comprises a variable wavelength semiconductor laser.

7. A light transceiver for use with an optical communication system that includes a plurality of light transceivers mutually connected to each other by means of a transmission line, said light transceiver comprising:
   first light receiving means for receiving a light signal which has a first wavelength and which is sent from other light transceivers;
   second light receiving means for receiving a light signal having a second wavelength different from the first wavelength;
   a common transmission line for transmitting the light signal having the first wavelength and the light signal having the second wavelength; and
   control means for controlling communications using the light signal having the first wavelength and for generating a signal which instructs another light transceiver to transmit the signal using the light having the second wavelength, instead of the light having the first wavelength, when the quality of the communications deteriorates.

8. The light transceiver according to claim 7, wherein said first and second light receiving means respectively comprise first and second variable wavelength band-pass optical filters and first and second photo-detectors for receiving light which has passed through said first and second filters.

9. The light transceiver according to claim 7, further comprising a light source for transmitting a light signal using light having a predetermined third wavelength for communication between the light transceivers in the optical communication system, and third light receiving means for receiving the light signal having the third wavelength.

10. An optical communication system, comprising:
    a plurality of first light transceivers, each of which comprises detecting means for detecting, from a predetermined wavelength range, fist and second wavelengths which are different from each other and which have not been used in other light transceivers, a first light source for transmitting a light signal using light having the first wavelength, a second light source for transmitting a light signal using light having the second wavelength, and switching means for selectively operating said first and second light sources in accordance with a command signal;
    a plurality of second transceivers, each of which comprises first light receiving means for receiving the light signal which has the first wavelength and which is sent from one of said first light transceivers, second light receiving means for receiving the light signal having the second wavelength, and control means for controlling communications using the light signal having the first wavelength and for generating the command signal which instructs the switching means of one of said first light transceivers to transmit signals using the light having the second wavelength, instead of the light having the first wavelength, when the quality of the communications deteriorates; and a transmission line for mutually connecting the plurality of first light transceivers and the plurality of second light transceivers, wherein the light signal having the first wavelength and the light signal having the second wavelength are transmitted through a common transmission line.

11. The optical communication system according to claim 10, wherein each of said detecting means in said first light transceivers comprises a variable wavelength band-pass optical filter for filtering light signals sent from other first light transceivers in said optical communication system, and a photo-detector for receiving a light signal which has passed through said filter.

12. The optical communication system according to claim 10, wherein each of said first light transceivers further comprises a third light source for transmitting a light signal using light having a predetermined third wavelength for communication between all of the first and second light transceivers in said optical communication system, and a third light receiving means for receiving the light signal having the third wavelength.

13. The optical communication system according to claim 10, wherein each of said first and second light sources comprises a variable wavelength semiconductor laser.

14. The optical communication system according to claim 10, wherein said first and second light receiving means in said second light transceivers respectively comprise first and second variable wavelength band-pass optical filters and first and second photo-detectors for receiving light which has passed through said first and second filters.

15. The optical communication system according to claim 10, wherein each of said second light transceivers further comprises a third light source for transmitting a light signal using light having a predetermined third wavelength for communication between all of the first and second light transceivers in said optical communication system, and a third receiving means for receiving the light signal having the third wavelength.

16. The optical communication system according to claim 10, wherein said transmission line comprises an optical filter.

17. A method of conducting communications using an optical communication system that includes a plurality of mutually connected light transceivers, said method comprising the steps of:

conducting communications between those light transceivers which are a selected pair of light transceivers using light having a set wavelength;

detecting interference in communications between the selected pair of light transceivers and interference in those light transceivers other than the selected pair; and shifting the set wavelength to avoid the interference when interference is detected in said detecting step.

18. The method of conducting communications according to claim 17, wherein the step of shifting the set wavelength to avoid the interference comprises a step of continuously shifting the set wavelength to separate the set wavelength from that wavelength used by other light transceivers.

19. A light transceiver for use in an optical communication system that includes a plurality of mutually connected light transceivers, said light transceiver comprising:

a variable wavelength light source for transmitting a light signal having a set wavelength;

receiving means for receiving the light signal generated by said light source and for receiving a light signal sent from another light transceiver in the optical communication system;

detection means for detecting interference between the signals received by said receiving means; and control means for shifting the wavelength of the light signal generated by said light source when the detection means detects interference.

20. The light transceiver according to claim 19, wherein said control means comprises means for continuously shifting the wavelength of the light signal generated by said light source to separate the set wavelength from that wavelength used by other light transceivers.

21. An optical communication system comprising:

a plurality of light transceivers, each of which comprises a variable wavelength light source for transmitting a light signal having a set wavelength, means for receiving the light signal generated by said light source and for receiving a light signal sent from another light transceivers, detection means for detecting interference between the signals, and control means for shifting the wavelength of the light signal generated by said light source when said detection means detects interference; and connection means for mutually connecting said plurality of light transceivers.

22. The optical communication system according to claim 21, wherein said connection means comprises an optical fiber.

23. A light transceiver for use in an optical communication system that includes a plurality of mutually connected light transceivers, said light transceiver comprising:

a variable wavelength light source for transmitting a light signal at a set wavelength;

a first variable wavelength filter for passing light having a narrow wavelength range, the center of which range coincides with the set wavelength;

a second variable wavelength filter for passing light having a narrow wavelength range, the center of which range is slightly shorter than the set wavelength;

a third variable wavelength filter for passing light having a narrow wavelength range, the center of which range is slightly longer than the set wavelength;

an optical device for inputting both the light signal generated by said light source and a light signal sent from another light transceiver into said first, second, and third variable wavelength filters, respectively;

first, second, and third photo-detectors for respectively receiving the light which has been passed through said first, second, and third variable wavelength filters and for generating respective outputs;

an approach detection circuit for detecting, from the outputs of said second and third photo-detectors, an approach between the wavelength of the light signal generated by said light source and a wavelength of the light signal transmitted from the other light transceiver; and a control circuit for shifting the set wavelength of said light source when said approach detection circuit detects an approach between the wavelengths of the light signals.

24. A light transceiver for use in an optical communication system that includes a plurality of mutually connected light transceivers, said light transceiver comprising:

a variable wavelength light source for emitting a light signal having a set wavelength;

a first light modulator for modulating a portion of the light emitted from said light source using a signal to be transmitted;

a second light modulator for modulating another portion of the light emitted from said light source in accordance with a signal having a predetermined first frequency;

an optical device for mixing a portion of the light signal modulated by said first light modulator, a light signal transmitted from another light transceiver and the light signal modulated by said second light modulator and for producing a mixed light signal;

a photo-detector for detecting the light signal mixed by said optical device and for producing an output;

a mixture circuit for mixing the output of said photo-detector with an electrical signal having a predetermined second frequency;

a filter for passing a signal component having a low frequency and separated from the range of the second frequency of the electrical signal mixed in said mixture circuit; and a control circuit for detecting, from the signal component which has passed through said filter, an approach between the wavelength of the light emitted from said light source and a wavelength of the light signal transmitted from another light transceiver, and for shifting the set wavelength of said light source when an approach between the wavelengths of the light signals has been detected.

25. The light transceiver according to claim 24, further comprising a circuit for comparing a phase of the signal component which has passed through said filter and a phase of the signal having the first frequency.

26. The light transceiver according to claim 24, wherein said second light modulator comprises a circuit for generating a sine wave signal having the first frequency and an optical modulation device driven in accordance with the generated sine wave signal.

27. The light transceiver according to claim 24, further comprising a low-pass filter for filtering a portion of the output of said photo-detector without mixing the output with the electrical signal having the second frequency, to produce a filtered signal, and for inputting the filtered signal to said control circuit.

* * * * *

UNITED STATES PATENT AND TRADEMARK OFFICE
CERTIFICATE OF CORRECTION

PATENT NO. : 5,202,782
DATED : April 13, 1993
INVENTOR(S) : Kenji Nakamura, et al.

It is certified that error appears in the above-indentified patent and that said Letters Patent is hereby corrected as shown below:

ON THE COVER PAGE, Item [56]

Under "U.S. PATENT DOCUMENTS" the following should be inserted:

--4,592,043   5/1986   Williams
  4,783,852  11/1988   Auracher--.

Under "FOREIGN PATENT DOCUMENTS" the following should be inserted:

--0215373    3/1987   EPA
  62-171334  7/1987   Japan
  0281306    9/1988   EPA--.

Under "OTHER PUBLICATIONS" the following should be inserted:

--"Wavelength Division Multiaccess Network Using Component Centralization, Local Oscillator Injection Locking and Homodyne Detection," IBM Technical Disclosure Bulletin, Vol. 30, No. 9, 2/1988, pgs. 262-267.--

UNITED STATES PATENT AND TRADEMARK OFFICE
CERTIFICATE OF CORRECTION

PATENT NO. : 5,202,782
DATED : April 13, 1993
INVENTOR(S) : Kenji Nakamura, et al.

It is certified that error appears in the above-indentified patent and that said Letters Patent is hereby corrected as shown below:

COLUMN 6

Line 2, "4." should read --Y.--.

COLUMN 9

Line 17, "and" should read --and 212--; and
Line 22, "and" should read --and 212--.

COLUMN 10

Line 18, "detected" should read --detect--.

COLUMN 12

Line 42, "photo-detector 61" should read --photo-detector 561--.

Signed and Sealed this

First Day of March, 1994

Attest:

BRUCE LEHMAN

Attesting Officer

Commissioner of Patents and Trademarks